March 16, 1965  T. S. BOSICO  3,173,865
WATER CLEANING SYSTEM FOR SWIMMING POOLS
Filed Jan. 23, 1962
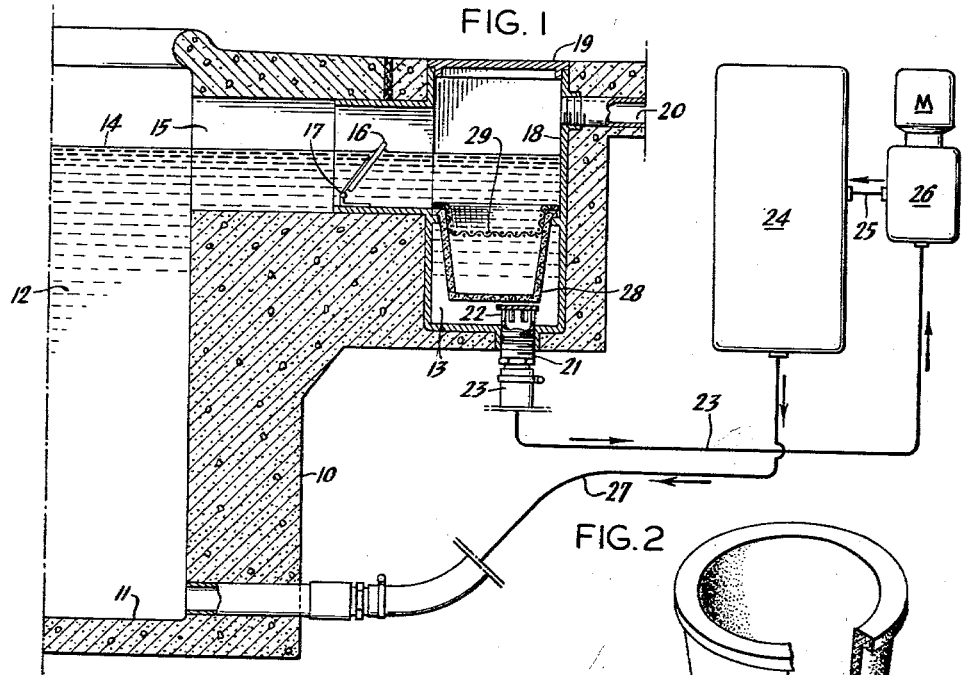
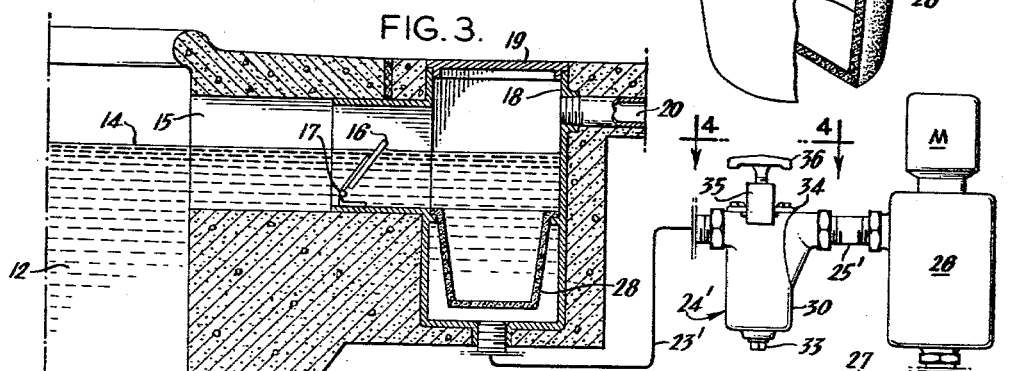
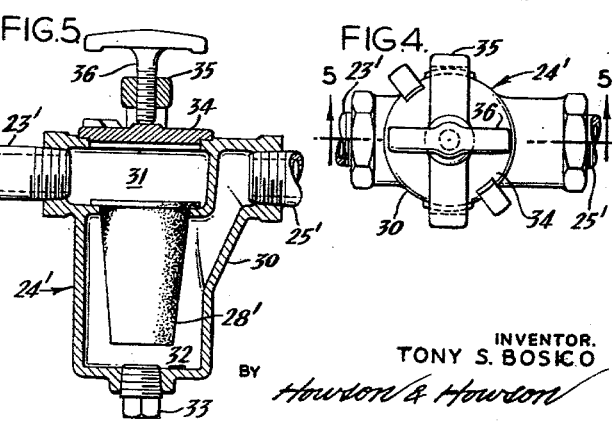
INVENTOR.
TONY S. BOSICO
BY Howson & Howson
ATTYS.

United States Patent Office 3,173,865
Patented Mar. 16, 1965

3,173,865
WATER CLEANING SYSTEM FOR SWIMMING POOLS
Tony S. Bosico, % Penn Valley Gunite Co., Line St., R.D., Lansdale, Pa.
Filed Jan. 23, 1962, Ser. No. 168,180
2 Claims. (Cl. 210—169)

This invention relates to a water cleaning system for swimming pools and has for an object the provision of improvements in this art.

The present usual arrangement for cleaning swimming pool water is to pump the water around through a tank containing a bed or body of fine-grained filter material and this is supplemented by drawing the surface water off over a baffle or skimmer into a gutter or well to remove floating and fine particles such as leaves, hair, dust, flying seeds, bird droppings, feathers and the like. The baffle or skimmer retains the larger floating particles in the gutter or well to prevent their return to the body of water in the pool and a coarse screen is often provided for the intake to the pump to keep other large water-entrained particles out of the pump and filter.

However, the smaller particles which are larger than those that the filter bed is designed to handle still get through and clog up the filter bed in an unreasonably short itme. Backwashing the filter does not properly remove them and at intervals it is necessary to use other and unduly expensive methods for putting the filter bed back in good condition.

According to the present invention there is provided a pump intake in the bottom of the gutter or well and in this intake there is provided a pre-filter cup which removes these relatively small particles so they do not pass to the tank filter. Preferably a wire screen or strainer is provided for the pre-filter cup to keep larger particles out of it. The pre-filter is located in a place where it is always easily accessible for cleaning and it is of such a nature that it can readily be cleaned by washing in a strong stream of water, as from a hose, and preferably in the direction opposite to normal direction of water flow through it.

In cases where a tank filter is not provided a second cup filter similar to the one at the gutter or well but placed near the pump can be used in conjunction with the gutter pre-filter cup to provide relatively good results.

The character of the cup is important, as will be explained.

The invention as well as certain features of novelty and advantages may better be understood from a description of an exemplary embodiment thereof, reference being made to the accompanying drawings, wherein:

FIG. 1 is a schematic view which includes a vertical section of a portion of a swimming pool and a diagram of a filter and pump installation:

FIG. 2 is an enlarged isometric view, partly in section, of a filter cup alone;

FIG. 3 is a schematic view like FIG. 1 but showing a system which does not have a tank filter;

FIG. 4 is an enlarged plan view taken on the line 4—4 of FIG. 3 to show a filter cup and cage for a pump intake line;

FIG. 5 is a section taken on the line 5—5 of FIG. 4; and

FIG. 6 is a partial side elevation of the parts shown in FIG. 4 to reveal the cap clamping means.

FIG. 1 shows a swimming pool having side walls 10 and a bottom 11 holding a body of water 12. A gutter or well 13 is provided in the side wall below the water level 14 and an inlet passage 15 is provided to allow water from the pool to enter the gutter or well.

A baffle or skimmer 16 is hinged at 17 along its lower edge end either floats upward because of its own buoyancy or by a float in known manner to cause water with debris to flow over it into the gutter or well and to prevent the debris from getting back to the body of water in the tank.

The gutter or well and part of the passage 15 are preferably part of a single pre-formed casing 18 of metal, concrete, terracotta, or the like, with a removable access cap 19.

An overflow pipe 30 is provided in the upper part of the casing.

A drain pipe 21 with a screen 22 is provided in the bottom of the gutter or well for the end of an intake pipe 23 for a tank filter 24 containing a bed body of filter material. The pipe 23 is connected to the intake side of a pump 26 driven by a motor M. A pipe 25 conducts water from the pump to the filter and a discharge or return pipe 27 conducts water from the filter back into the pool.

The casing 18 provides a seat which carries a filter cup or basket 28, the cup preferably having a wire screen 29, as of copper, over the top to collect larger objects.

It is common to have the pump and filter located below the water level to conserve power in pumping.

In FIG. 3 a simpler system is shown in which the tank filter 24 is replaced by a cup filter 24', the cup filter including a casing 30 with an intake pipe 23' for an intake chamber 31 and an outlet pipe 25' for an outlet chamber 32. Between the chambers 31 and 32 a seat is provided for a filter cup 28'. A drain plug 33 is provided in the bottom of the casing. A removable cover 34 permits the cup 28' to be removed for cleaning, the cover being held by a bail 35 and a clamp screw 36. Other parts in FIG. 3 are the same as in FIG. 1 and the same reference designations are used. It may be noted, however, that in large installations such as are indicated in FIG. 1 the skimming gutter usually extends entirely around the pool whereas in smaller installations local gutters and wells are more usual.

The filter cup 28 alone is shown in FIG. 2. It is of a very unique character especially designed for the intermediate filter service for which it is used. It must pass large volumes of water, say twenty-five gallons per minute, and remove intermediate sized objects to prevent them from reaching the pump filter to clog it. Larger objects are removed by the screen 29, which preferably is provided in the FIG. 3 form also.

In the preferred form the cup is made of a special mix in a special way to get the desired open porosity of intermediate sized pores. Four parts of steel slag of waylite with one part of Portland cement in a dry mix using three gallons of water to one hundred pounds of mix has been found to give good results. The mixture is tamped into a mold and dried and cured for about twelve hours, then soaked in water to impart strength.

Other aggregates which can be used are marble chips, sand, ground sponge, ground rubber, ground plastic chips, crushed stone, and the like in suitable particle size.

The cup is made frustoconical with a flat supporting lip and is fitted closely on its supporting seat to avoid leakage there. It is possible to use elongated shapes instead of a conical shape. Various sizes can be used.

It has been found that when this intermediate filter is used the life of the pump filter is greatly prolonged between cleanings. The filter cup itself is readily removed through the top of its casing and can be quickly restored to prime usefulness simply by washing it off with a hose.

It is thus seen that the invention provides an improved water cleaning installation and an improved filter body which makes swimming pool maintenance much less troublesome and expensive than has been known before.

While certain embodiments of the invention have been disclosed for purposes of illustration, it is to be under-

I claim:

1. A water cleaning system for swimming pools, comprising in combination, a casing disposed near the side of the pool and having a lateral passage to the pool chamber embracing the water level to allow a body of water to enter the side of the casing with an air space above the water level, said casing having a full-size upwardly extending portion opening to the surface around the pool, a removable cap on said upwardly extending portion whereby said portion is open for its full size when the cap is removed, a floating skimmer in said lateral passage to hold back larger floating material on the pool side, said casing having a full-size downwardly extending well portion closed at the bottom except for a central pipe connection opening, an outlet pipe connected to said bottom opening, an annular cup seat in said downwardly extending well portion, a porous filter cup having an outer top peripheral flange seated on said annular seat with the top of the cup at the level of the bottom of said lateral passage, leaving space around its sides and below its bottom, a cup-shaped screen seated in the top of said cup, said cup and screen being removable through the top of the vertically extending portion when the cap is removed, a pump connected to said outlet pipe to withdraw water therethrough and having a return pipe to the pool, and a line filter in the pipe line between said outlet pipe and said return pipe, said cup having pores of intermediate size, compared to said screen and said line filter, to stop particles of intermediate size while still permitting rapid flow of water therethrough.

2. A water cleaning system as set forth in claim 1, in which said line filter includes a fixed cup-shaped casing having an open top and a removable cover therefor, means to clamp the cover on the casing, said outlet pipe being connected to the top of said line filter casing at one side of a top chamber beneath the cover, a cup supporting seat in the bottom of said top chamber, a porous filter cup having a flange resting on said seat and being removable through the top of said casing when the cover is removed, said casing having a lower chamber around and below said cup separated from said top chamber, and an offtake pipe connected to the top of said lower chamber above the top of the cup.

References Cited by the Examiner

UNITED STATES PATENTS

| | | | |
|---|---|---|---|
| 235,961 | 12/80 | Praetorius | 210—496 X |
| 2,324,878 | 7/43 | Richmond | 210—510 X |
| 2,605,902 | 8/52 | Curtis | 210—510 X |
| 2,826,307 | 3/58 | Pace | 210—169 |
| 3,051,312 | 8/62 | Arge | 210—169 X |

REUBEN FRIEDMAN, *Primary Examiner.*

HERBERT L. MARTIN, *Examiner.*